Dec. 17, 1946.　　　T. F. LEE ET AL　　　2,412,780
HAT BAND CUTTING MACHINE
Filed Feb. 4, 1946　　　5 Sheets-Sheet 1

INVENTORS
THOMAS F. LEE
HERBERT R. IVES
BY
Darby & Darby
ATTORNEYS

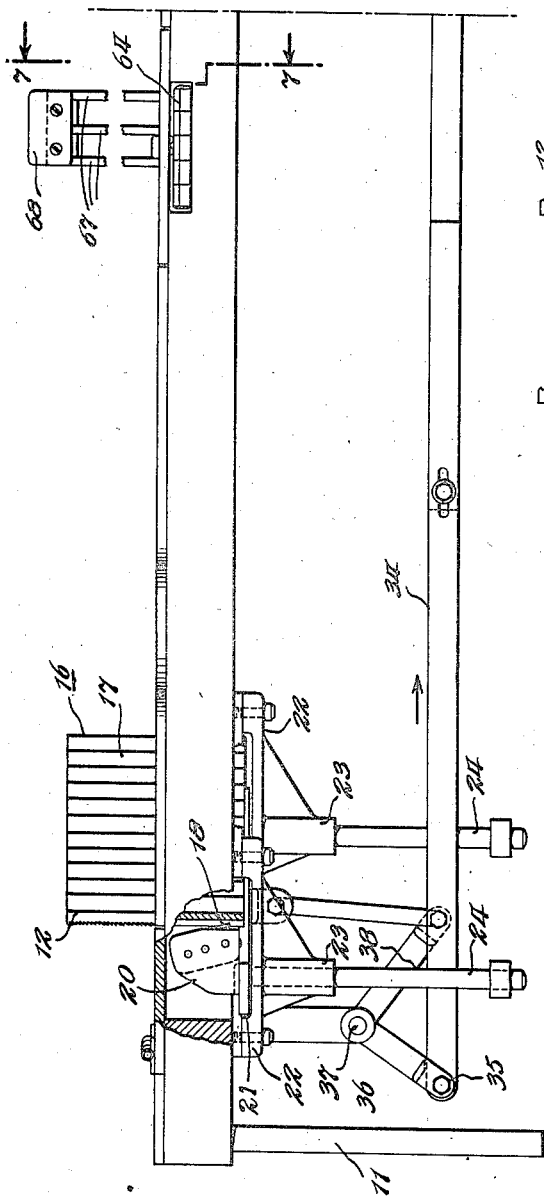

INVENTORS
THOMAS F. LEE
HERBERT R. IVES
BY Darby + Darby
ATTORNEYS

Dec. 17, 1946.　　　T. F. LEE ET AL　　　2,412,780
HAT BAND CUTTING MACHINE
Filed Feb. 4, 1946　　　5 Sheets-Sheet 4

INVENTORS
THOMAS F. LEE
HERBERT R. IVES
BY
ATTORNEYS

Dec. 17, 1946. T. F. LEE ET AL 2,412,780
HAT BAND CUTTING MACHINE
Filed Feb. 4, 1946 5 Sheets-Sheet 5
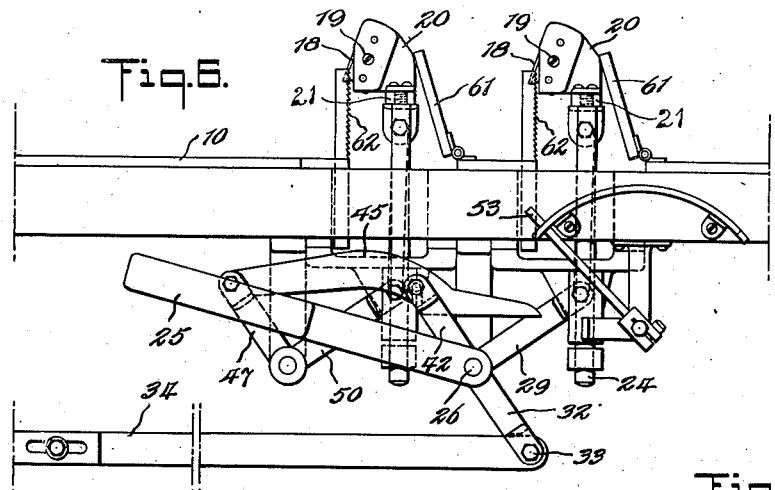
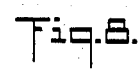
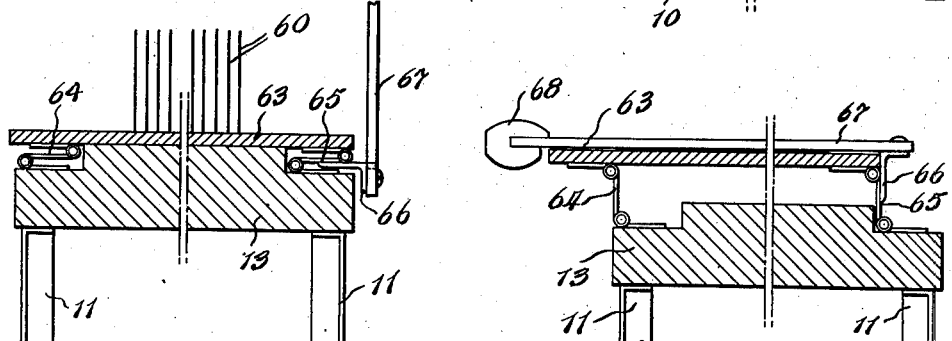
INVENTORS
THOMAS F. LEE
HERBERT R. IVES
BY Darby + Darby
ATTORNEYS Patented Dec. 17, 1946

2,412,780

UNITED STATES PATENT OFFICE 2,412,780

HATBAND CUTTING MACHINE

Thomas F. Lee and Herbert R. Ives, Danbury, Conn., assignors to The Frank H. Lee Company, Danbury, Conn., a corporation of Connecticut Application February 4, 1946, Serial No. 645,365

13 Claims. (Cl. 164—47)

The present invention relates to a machine adapted to cut long bands of material into predetermined lengths.

More particularly the invention comprehends a machine for cutting the normal type of hat band material as, for example, grosgrain ribbon into the lengths necessary to provide the common band and bow for trimming a felt hat.

Felt hats are normally ordered and processed in dozen lots and as a consequence of this practice the trim bands therefor are prepared in dozen lots, there being definite, commonly used numbers of various sizes forming the dozen.

In the past, the common method of preparing the bands, that is, cutting them to the proper lengths and marking the location for the bow, has been to provide the operator with a board having a number of pegs or nails driven therein about which the trim material or ribbon was looped in accordance with the particular order so that there would be lengths extending between the pegs in accordance with the order. Then the bands were removed from the pegs and cut by scissors at the fold lines where the bands had been on the pegs. As can be readily seen this procedure was wasteful of material because the scissors cut was frequently made to one side or the other of the proper location, in some instances resulting in bands which were too short and had to be discarded and in others resulting in bands which were too long and from which the excess material had to be removed prior to use.

By my invention a means is provided by which trim band material is cut into predetermined lengths while on the pegs on a peg-board, the cut being made at the exact fold line whereby each band is accurately cut and the wastage formerly prevalent is completely eliminated. Furthermore, I provide a means for marking the location of the bow which renders it extremely simple to mark this location and which provides for the different locations depending upon the type of bow to be utilized. Additionally, the machine is so arranged that the predetermined length may be in accordance with the type of bow which is to be utilized since there are two commonly used forms of bow which require different lengths of material.

It is an object of the present invention to provide a machine for cutting ribbon or similar material in long lengths into predetermined shorter lengths.

It is another object of the invention to provide a machine particularly adapted to the cutting of trim band material for hats into predetermined lengths a dozen at a time in accordance with the customary practice in the hat industry.

It is a further object of the invention to provide such a machine in which the cutting is performed while the trim band material is in place in the machine so that the cuts are accurately positioned and wastage of material is substantially eliminated.

It is a still further object of the invention to provide a machine such as indicated above so arranged that hat bands of a number of different types may be cut on the one machine.

It is a still further object of the invention to provide such a machine in which a means is provided for determining the location of the bow utilized in connection with such hat bands.

Other objects and features of the invention will be apparent when the following description is considered in connection with the annexed drawings, in which—

Figure 1 is a top plan view of the hat band cutting machine of our invention;

Figures 2 and 3 together comprise a front elevation of the machine of our invention, certain parts being broken away to show the construction of the moving parts thereof;

Figure 6 is a partial front elevation of the machine showing the parts in their operated position. This view differs from Figure 4 in that it shows a second mode of operation of the machine;

Figure 7 is a cross sectional view of the machine of Figure 1 showing particularly the means for marking the bow location upon the trim ribbon;

Figure 8 is a top plan view of the mechanism of Figure 7; and

Figure 9 is a view similar to Figure 7 showing the parts of the bow location marking mechanism in operated position.

Figure 1:
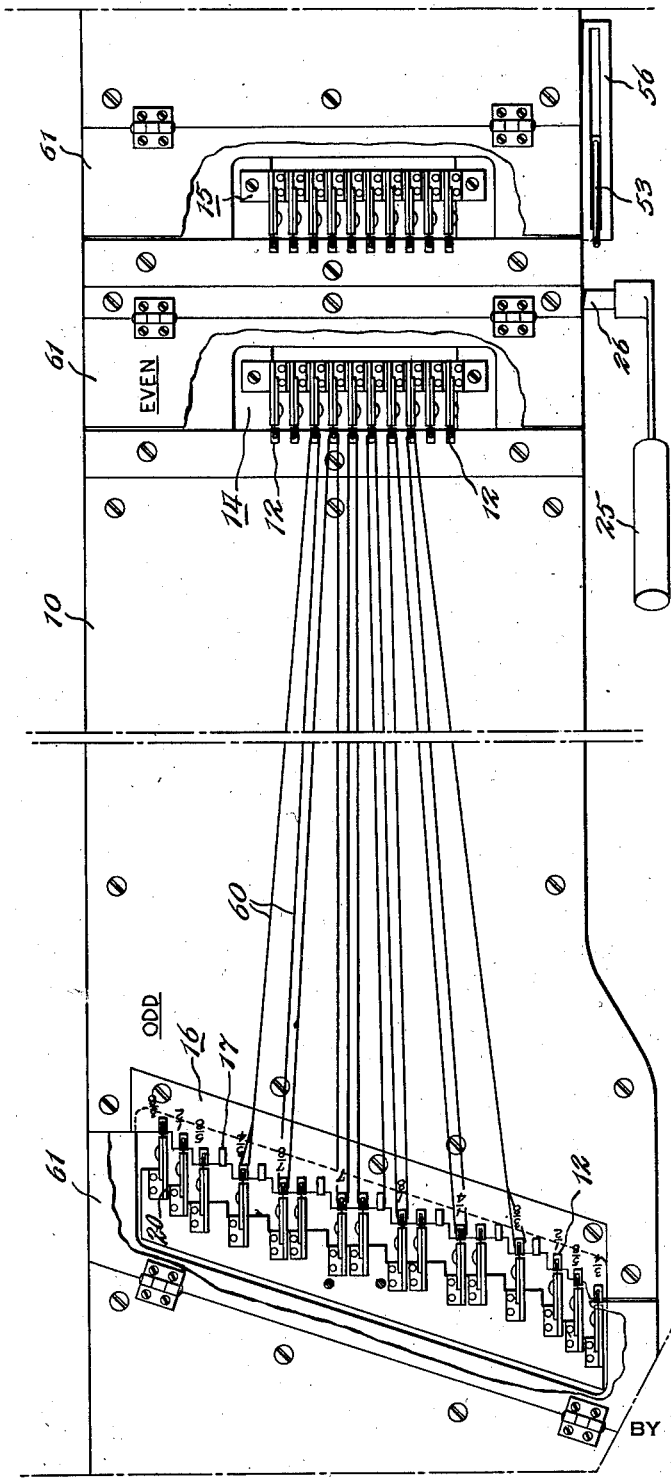

Referring now to the drawings, the machine of our invention comprises a table top 10 which is supported by the usual legs 11, these parts being of wood or any other suitable material. Extending through the table 10 and for a considerable distance above and below it are a plurality of channels 12 which are fastened to the table in any suitable manner as, for example, by screws inserted through the base of the channels into the cross bracing members 13.

The channels 12 are arranged in three sets, generally designated 14, 15, and 16. The sets of channels 14 and 15 are arranged in a straight line transversely of the table 10 and the two sets are provided in order that the two commonly used types of hat band bows may be prepared on the single machine. The set of channels 16 is arranged in a particular staggered relationship to provide for lengths corresponding to the different hat sizes. Additionally, the set 16 is provided with a number of pegs or channels 17 which may be termed "dummy" channels since, as will be shown later, they have no cutting elements associated with them and are provided merely to make possible the cutting of a larger number of bands of any given hat size.

Cooperating with each of the channels 12 is a cutting member 18 which may be an ordinary double edge razor blade. These cutting members 18 are arranged to move vertically within the channels 12, the members 18 being mounted at an angle to the vertical so that a true cutting action is performed. Each member 18 is fastened by means of the screw 19 to a bracket 20, each of the brackets 20 being mounted on a frame 21 individual to each group of cutters 14, 15 or 16.

Frames 21 are guided for vertical reciprocation by means of two end plates 22 which are formed with a cylindrical boss 23 thereon, these bosses being provided with central bores through which the guide rods 24 pass. Guide rods 24 are fastened to the underside of the frames 21 as is clearly shown in Figures 2 and 3 so that the frames 21 are guided for vertical reciprocation.

The means for operating the frame 21 associated with the right hand group of cutters 15 comprises a handle 25 which is fastened to a shaft 26 which shaft is pivotally mounted in bearings 27 supported by arms 28 depending from the lower side of the table 10. Fixed to the shaft 26 is an arm 29 having a bifurcated end which straddles and is pivotally connected to a link 30 which is in turn pivotally connected to a downwardly extending bifurcated portion of a bracket 31 fastened to the frame 21. Thus, as the handle 24 is moved in a counterclockwise direction the arm 29 likewise moves counterclockwise and elevates the frame 21 bearing the cutters of the group 15, thereby severing the band which has been looped in a predetermined manner about the channels 12 of that group.

Movement of shaft 26 likewise causes movement of the arm 32 fastened to shaft 26. Arm 32 is bifurcated at its outer end as indicated at 33 and is pivotally connected to a link 34 which extends longitudinally of the machine and is connected at its far end to the bifurcated end 35 of an arm 36 which arm is mounted on the shaft 37 associated with the cutters of the group 16. Mounted on shaft 37 is an arm 38 similar to the arm 32 previously mentioned which arm is bifurcated at its outer end and pivotally connected to a link 39 which is in turn pivotally connected at its other end to a downwardly extending bifurcated portion of a bracket 40 mounted on the member 41 of the frame 21 associated with the left hand group of cutters 16. By this means simultaneous operation of the cutters 18 of the groups 15 and 16 is brought about.

As has been indicated above it is at times desired to utilize the channels and cutters of the group designated 14 rather than those designated 15 and when this is desired the mechanism is arranged so that both groups of cutters 14 and 15 are elevated but the action of the group 15 is ineffectual since the trim ribbon or band will have been looped about the channels cooperating with the group of cutters designated 14.

As may be seen, particularly by reference to Figure 3, the shaft 26 carries an arm 42 which at its outer end is provided with a pin 43 which extends beneath a notch 44 in an arm 45 which arm is pivotally mounted in the bifurcated end 46 of an arm 47 mounted on a shaft 48. Shaft 48 is supported in arms 49 extending downwardly from the table 10 in a manner substantially identical to that in which the shaft 26 is supported. Fixed to shaft 48 is an arm 50 which is bifurcated at its outer end and in which is pivotally mounted a link 51, the other end of which extends between the bifurcations of a bracket 52 mounted on the frame 21 associated with the group of cutters 14. It will be seen that normally when the handle 25 is moved in a counterclockwise direction the pin 43 causes movement of the link or arm 45 and, consequently, oscillation of the shaft 48 resulting in elevation of the frame 21 and of the cutters 18 of the group designated 14 simultaneously with the cutters of the other two groups 15 and 16.

Figure 4:
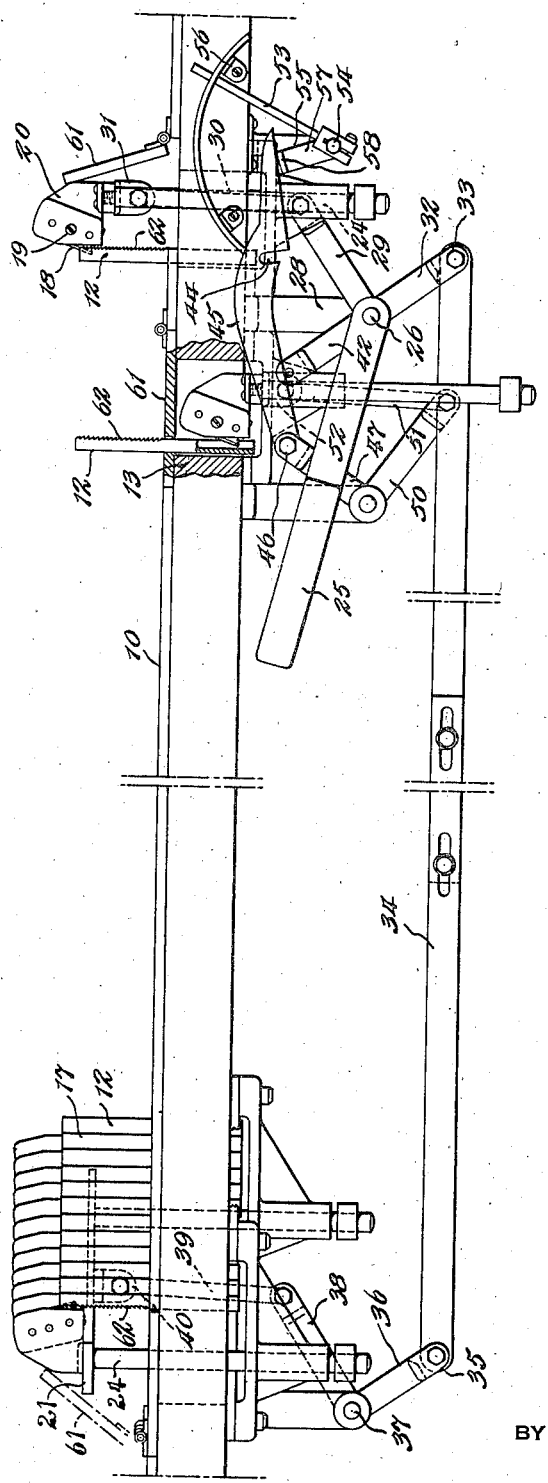
Figure 4 is a view similar to that of Figures 2 and 3 but showing the parts in one of their operated positions.
Figure 5:
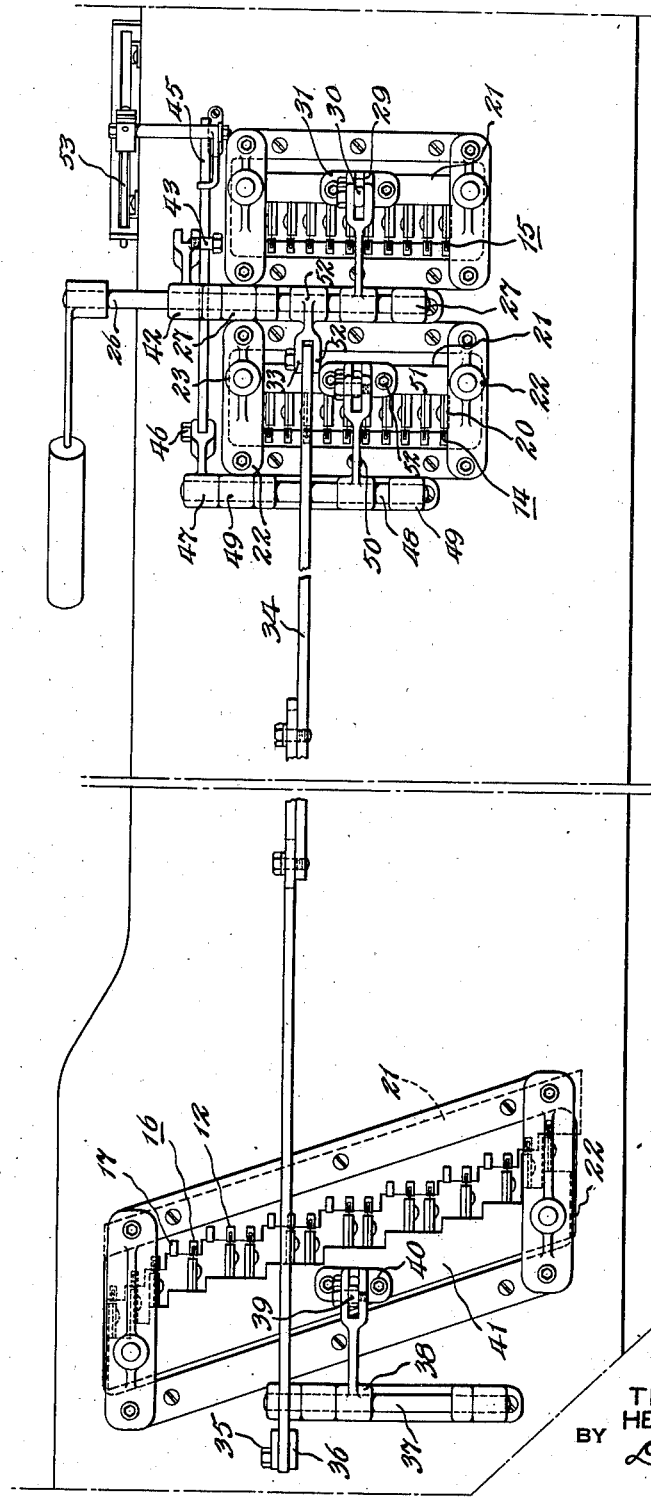
Figure 5 is a bottom elevation of the machine of Figures 1 through 4.

When it is desirable to have only the group of cutters 15 operated this is accomplished by disengaging the notch 44 from its cooperating pin 43 so that movement of arm 42 is ineffective to produce elevation of the cutters of group 14. This selection as to whether one or both of the groups of cutters 14 or 15 is to be operated is brought about by means of a handle 53 fixed to a shaft 54 supported in a bracket 55 fixed to the lower side of the table 10. The amount of movement of the handle 53 is determined by means of the guide plate 56 which is suitably mounted on the skirt of the table 10. Shaft 54 carries an arm 57 which is bent over at its outer end as shown at 58 and lies beneath an extension of the arm or link 45. Thus, in the normal position, as shown in Figure 3, the notch 44 is permitted to encompass the pin 43 but when the handle 53 is moved to its clockwise limit of oscillation the bent over end 58 of arm 57 raises link 45 and disengages the notch 44 from the pin 43 with the result that the arm 42 may oscillate without driving the link 45 and consequently without causing elevation of the cutting members 18 of the group 14. Figure 4 illustrates the operation of the mechanism to produce the result of vertical elevation of the cutters 18 of the groups 15 and 16 and non-elevation of the group 14.

Figure 6 illustrates the operation when the handle 53 is placed in its extreme counterclockwise position in which the notch 44 engages with the pin 43 and as a result of which all three groups of cutters are simultaneously elevated.

Referring now to Figure 1 there is shown therein a ribbon or hat band material 60 which is clamped to one of the channels and is looped about a plurality of other channels of the groups 14 and 16 and finally clamped again to another one of the channels of group 16. The particular arrangement illustrated in the drawings is designed to yield a dozen hat bands of which one is for a size 6¾ hat, two are for size 6⅞ hats, three are for size 7 hats, three are for size 7⅛ hats, two are for size 7¼ hats, and one is for a size 7⅜ hat. In this connection it will be noted that the left hand group of cutting members and channels 16 is designated "odd" and the right hand groups 14 and 15 are designated "even"; this is because of the fact that when odd numbers of bands of a size occur in the grouping the starting and finishing points of the original piece of material are at the left on the groups of channels associated with the cutting members 16 whereas when the arrangement of sizes within the dozen includes only even numbers the starting and finishing points are on the right hand end utilizing the channels associated either with the group 14 or the group 15.

It will also be noted that the left hand group of channels includes the previously mentioned "dummy" channels 17 which are utilized, in some instances, to produce uneven numbers of bands. Thus, it will be seen that one of the size 7⅛ bands is produced by looping the material over a "live" channel associated with a size 7 and over a "dummy" channel likewise associated with a size 7 so that the distance between the "live" and "dummy" channels is added to the length of the band and converts it to a size 7⅛.

As is clearly seen, particularly by reference to Figures 4 and 6, the table 10 is provided with the hinged portions or doors 61 which normally lie in the plane of the table and form an uninterrupted surface but which are caused to rotate about their hinge points when the group of cutters associated therewith are elevated, this being brought merely by the fact that the upper surface of the brackets 20 engage the under surface of the hinged members 61. It should also be noted that in order to prevent the material from riding off channels 12 or the "dummy" channels 17 these channels are provided with serrated edges 62 which prevent movement of the material upwardly as the cutters perform their work. These serrations 62 are effective because the material is clamped at one end to one channel and after being looped about the desired channels is clamped at its other end to another channel, the tension present in the portion of the material between the clamped ends holding it against the serrated edges. If desired, the material may be held by the operator at one end and tension may be applied to a reel from which the material is drawn to thereby hold the material against the serrated edges.

As has been indicated hereinabove a means is provided to facilitate the marking of the bands to indicate the location of the bow which is subsequently to be incorporated therein. This means comprises mounting a central section 63 of the table 10 upon double hinges 64 and 65. To the rear one of these double hinges 65 there is fastened a bracket 66 which supports the marking guides 67 carrying a handle 68 at their extremities. While the band material or ribbon 60 is looped about the channels 12 the handle is brought forwardly, thereby causing elevation of the central section 63 to the position shown in Figure 9 and likewise causing the marking guides 67 to come in contact with the various portions of the ribbon 60 and to cause them to lie flat upon the surface of the table portion 63. While the marking guides are in this position the operator draws a chalk line or other readily discernible mark across the ribbons, using one of the members 67 as a guide, the choice of the member depending upon the particular type of bow and location which is specified for the bands then being cut.

For example, one of the marking guides will indicate the location of the bow for a hat of the Homburg type whereas a second one will indicate the location for a dress hat of other than the Homburg type and the third one may indicate the location for a bow on a hat of the sports type. It will be seen that due to the elevation of the portion 63 of the table top the ribbon portions rotate substantially about their longitudinal center lines so that there is no undue twisting of these ribbons brought about by the marking operation.

While I have described a preferred embodiment of my invention it will be understood by those skilled in the art that other forms may be devised. I do not desire therefore to be restricted to the particular details shown and described but only within the scope of the appended claims.

What is claimed is:

1. In a machine for cutting ribbons into predetermined lengths, in combination, a table, a plurality of channels arranged thereon in groups to facilitate looping the ribbon about said channels to form predetermined lengths, and cutting means reciprocable in said channels to sever said ribbon into said predetermined lengths.

2. In a device for cutting ribbons into predetermined lengths, in combination, a table, a plurality of channels arranged thereon in groups, one of said groups comprising a plurality of channels arranged in a straight line transversely of said table, and another of said groups comprising a plurality of channels spaced from said first group and arranged in a staggered formation transversely of the table, said arrangement of said groups providing means for looping a ribbon about said channels to provide a predetermined number of varying lengths of ribbon and means cooperating with said channels for cutting said ribbon at its points of reversal.

3. In a device for cutting ribbons into predetermined lengths, in combination, a table, a plurality of channels arranged thereon in groups, one of said groups comprising a plurality of channels arranged in a straight line transversely of said table, and another of said groups comprising a plurality of channels spaced from said first group and arranged in a staggered formation transversely of the table, said arrangement of said groups providing means for looping a ribbon about said channels to provide a predetermined number of varying lengths of ribbon, means vertically reciprocable in said channels for cutting said ribbon at its points of reversal, and means comprising an oscillatable handle for reciprocating said cutting means.

4. In a device for cutting ribbons into predetermined lengths, in combination, a table, a plurality of channels arranged thereon in groups, one of said groups comprising a plurality of channels arranged in a straight line transversely of said table, and another of said groups comprising a plurality of channels spaced from said first group and arranged in a staggered formation transversely of the table, said arrangement of said groups providing means for looping a ribbon about said channels to provide a predetermined number of varying lengths of ribbon, means mounting said channels to extend through said table top, cutting means associated with each channel, a framework associated with each group of channels and cutting means, said groups of cutting means being mounted on said framework, means guiding said frameworks for vertical reciprocation, and manually operable means for reciprocating said frameworks simultaneously.

5. In a device for cutting ribbons into predetermined lengths, in combination, a table, a plurality of channels arranged thereon in groups, one of said groups comprising a plurality of channels arranged in a straight line transversely of said table, and another of said groups comprising a plurality of channels spaced from said first group and arranged in a staggered formation transversely of the table, said arrangement of said groups providing means for looping a ribbon about said channels to provide a predetermined number of varying lengths of ribbon, means mounting said channels to extend through said table top, cutting means associated with each channel, a framework associated with each group of channels and cutting means, said groups of cutting means being mounted on said frameworks, means guiding said frameworks for vertical reciprocation, a rotatable shaft associated with each framework, handle means for rotating one of said shafts, an arm on said last mentioned shaft, an arm on said other shaft, a link joining said arms, additional arms on each of said shafts, and links joining said additional arms to said frameworks, whereby oscillation of said handle serves to produce reciprocation of said frameworks and consequent reciprocation of said cutting means.

6. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, means for operating the cutting means of all said groups simultaneously and means for preventing the operation of the cutting means of one of the plurality of groups having a straight line arrangement transversely of the working surface.

7. In a device for cutting hat band material or the like into a predetermined number of variable lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide an associated framework for vertical reciprocation, a group of cutting means mounted on each said framework, each cutting means operating in one of said channels, means for vertically reciprocating all of said frameworks simultaneously, and means for preventing the reciprocation of one of said frameworks when desired.

8. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide the associated framework for vertical reciprocation, a group of cutting means mounted on each said framework, each cutting means operating in one of said channels, a main shaft supported beneath said working surface, a handle on said shaft, means joining said shaft to said frameworks to produce vertical reciprocation of said frameworks upon oscillation of said shaft, and means for disengaging said shaft from one of said frameworks to prevent reciprocation of said one framework while permitting reciprocation of the remainder thereof.

9. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide the associated framework for vertical reciprocation, a group of cutting means mounted on each said framework, each cutting means operating in one of said channels, a main shaft supported beneath said working surface, a handle on said shaft, a second shaft mounted beneath said working surface adjacent said staggered group of channels and cooperating framework, arms on said main and second shafts, a link joining said arms, and means on said first and second shafts connecting said shafts to corresponding frameworks whereby oscillation of said handle produces simultaneous vertical reciprocation of two of said groups of cutting means including said group associated with said staggered channels.

10. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide the associated framework for vertical reciprocation, a group of cutting means mounted on each said framework, each cutting means operating in one of said channels, a main shaft supported beneath said working surface, a handle on said shaft, a second shaft mounted beneath said working surface adjacent said staggered group of channels and cooperating framework, arms on said main and second shafts, a link joining said arms, a third shaft mounted beneath said working surface adjacent a second group of said straight line arranged channel members, an arm on said third shaft, a link extending from said arm, an arm on said main shaft adjacent one end of said link, a pin on said last mentioned arm, a notch in said link cooperating with said pin, and means joining each of said shafts with the cooperating framework whereby oscillation of said handle produces vertical reciprocation of said frameworks and the associated cutting means.

11. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide the associated framework for vertical reciprocation, a group of cutting means mounted on each said framework, each cutting means operating in one of said channels, a main shaft supported beneath said working surface, a handle on said shaft, a second shaft mounted beneath said working surface adjacent said staggered group of channels and cooperating framework, arms on said main and second shafts, a link joining said arms, a third shaft mounted beneath said working surface adjacent a second group of said straight line arranged channel members, an arm on said third shaft, a link extending from said arm, an arm on said main shaft adjacent one end of said link, a pin on said last mentioned arm, a notch in said link normally cooperating with said pin, means joining each of said shafts with the cooperating framework whereby oscillation of said handle produces vertical reciprocation of said frameworks and the associated cutting means, and means for oscillating said link about its connection to its cooperating arm to thereby disengage said notch from said pin and render operation of said handle ineffective to reciprocate one of said frameworks.

12. In a device for cutting hat band material or the like into a predetermined number of varying lengths, in combination, a working surface, a plurality of channels mounted therein, said channels being arranged in a plurality of groups, one of said groups of channels being arranged in a staggered formation generally transversely of said working surface, and the remaining groups being spaced from said first group and each arranged in a straight line formation transversely of said working surface, cutting means arranged for vertical reciprocation in said channels, a framework associated with each group of channels, guide members fixed to said working surface beneath each group of channels, said guide members serving to guide the associated framework for vertical reciprocation, a group of cutting means mounted on each said framework, each cutting means operating in one of said channels, a main shaft supported beneath said working surface, a handle on said shaft, a second shaft mounted beneath said working surface adjacent said staggered group of channels and cooperating framework, arms on said main and second shafts, a link joining said arms, a third shaft mounted beneath said working surface adjacent a second group of said straight line arranged channel members, an arm on said third shaft, a link extending from said arm, an arm on said main shaft adjacent one end of said link, a pin on said last mentioned arm, a notch in said link normally cooperating with said pin, means joining each of said shafts with the cooperating framework whereby oscillation of said handle produces vertical reciprocation of said frameworks and the associated cutting means, and means for oscillating said link about its connection to its cooperating arm to thereby disengage said notch from said pin and render operation of said handle ineffective to reciprocate one of said frameworks, said oscillating means comprising a shaft supported beneath said working surface, a handle thereon for oscillating said shaft and an arm fixed to said shaft and lying beneath the end of said link to thereby raise said link and disengage said notch from said pin.

13. In a device for cutting ribbons into predetermined lengths, in combination, a table, a plurality of channels arranged thereon in groups, one of said groups comprising a plurality of channels arranged in a straight line transversely of said table, and another of said groups comprising a plurality of channels spaced from said first group and arranged in a staggered formation transversely of the table, said arrangement of said groups providing means for looping a ribbon about said channels to provide a predetermined number of varying lengths of ribbon, means cooperating with said channels for cutting said ribbon at its points of reversal, and means located between said groups of channels and extending transversely of the table to provide a guide for marking said ribbons to indicate the location of members to be added thereto, said means comprising a transverse section of said table top, double hinged means connecting said section to said table to provide for elevation thereof, a plurality of guide members fixed to one of said double hinged means, whereby movement of said handle elevates said table top section to cause rotation of the ribbon sections about their horizontal axes and places said guide means on said ribbons and extending transversely of the elevated table top section to thereby form guides for performing the said marking operation.

THOMAS F. LEE.
HERBERT R. IVES.